UNITED STATES PATENT OFFICE.

JOHN HAVERSTICK, OF PHILADELPHIA, PENNSYLVANIA.

COMPOSITION FOR FLOOR-COVERINGS, &c.

SPECIFICATION forming part of Letters Patent No. 619,019, dated February 7, 1899.

Application filed December 17, 1897. Serial No. 662,260. (No specimens.)

*To all whom it may concern:*

Be it known that I, JOHN HAVERSTICK, of Philadelphia, in the State of Pennsylvania, have invented a certain new and useful Improvement in Compositions for Floor-Coverings, &c., whereof the following is a specification.

My invention relates to that class of floor-coverings which includes oil-cloth, linoleum, and other manufactures known by various trade-names, the main characteristic being that a canvas backing or other flexible foundation is coated between heated rollers with an adhesive plastic composition adapted, when firmly set and dried, to resist wear and moisture.

I have invented a new composition of matter adapted to constitute the plastic adhesive element which I have found to be not only exceedingly economical and simple in manufacture, but more readily pressed onto the canvas or other backing and more adhesive than compounds previously used so far as known to me, the resulting product being also exceedingly solid, compact, and durable.

To produce this composition of matter, I proceed as follows: I take ordinary corncobs, (not the stalk or other portion of the plant, but the cob,) with the kernels removed, and if the same are not in a substantially dry condition I thoroughly dry them by the application of moderate heat. I then pass the cobs through a bur or roller mill, grinding them into a fine powder, which is bolted through a thirty-mesh sieve, so as to produce as far as possible a uniformly-pulverized mass. Taking twenty-seven parts, by weight, of the powdered corncob, I mix with it fifteen parts, by weight, of linseed-oil, six parts, by weight, of purified rosin, and about four parts of the coloring-matter ordinarily used in such compounds. These materials are thoroughly mixed, preferably by any well-known form of mechanical mixer, to produce a homogeneous compact mass which is very elastic and flexible. This mass is then applied to the backing by passing it between heated rollers adapted to produce the desired thickness and then subjected to heat for a short time in the well-known manner usual in the manufacture of this class of floor-coverings. I do not deem it necessary to enter into the details of this part of the process of manufacture, since they are well known to the makers of this class of products, and the treatment may be varied in accordance with the practice of individuals. The fabric thus made may of course be printed or decorated by any of the ordinary processes, which feature, however, forms no part of my present invention.

I have found that the dried and ground corncob has a peculiar availability as a filling or base for the purpose specified. It is largely made up of material of a hard shelly nature, relatively dense and compact, not absorbent in the highest degree of the linseed-oil and other binding material used with it, and therefore giving especial economy to the process, apart from the great cheapness of the material itself. It is of course necessary that the powdered material which forms the base or filling of the mass shall have a certain degree of absorptive capacity in order that the mixture may be thoroughly coherent and homogeneous. On the other hand, intensely-absorbent or very porous materials occasion an unnecessary waste of the more expensive ingredients. The dried and powdered corncob has been found by me, after extended search for materials adapted for the purpose, to combine in an almost perfect manner the various qualities which are desirable for the specified purpose, and as a composition of matter the resultant product is admirably fitted for its purpose.

I of course do not limit my claim to the use of the exact binding materials above specified, nor to the exact proportions, since such materials and proportions are merely stated as typical of those which are required to supply the several elements of the plastic mass. It must be understood, therefore, that the binding material may be varied by the use of equivalent binders within the limits fairly understood by those skilled in this art. So, also, other filling materials might be added to the ground corncob without depriving the composition of its essential characteristics.

Having thus described my invention, I claim—

As a new composition of matter for floor-coverings, &c., the hereinbefore-described compound consisting of a base or filling of ground corncob, and a binding material, substantially as set forth, the whole incorporated into a homogeneous mass.

JOHN HAVERSTICK.

Witnesses:
G. HERBERT JENKINS,
JAMES H. BELL.